United States Patent
Mann et al.

(10) Patent No.: US 6,373,615 B1
(45) Date of Patent: Apr. 16, 2002

(54) NEUTRAL-COLORED GRAY PHOTOCHROMIC PLASTIC OBJECT

(75) Inventors: Claudia Mann, Munich; Manfred Melzig, Wessling; Udo Weigand, Munich, all of (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 09/600,081

(22) PCT Filed: Nov. 16, 1999

(86) PCT No.: PCT/EP99/08791

§ 371 Date: Jul. 11, 2000

§ 102(e) Date: Jul. 11, 2000

(87) PCT Pub. No.: WO00/29877

PCT Pub. Date: May 25, 2000

(30) Foreign Application Priority Data

Nov. 16, 1998 (DE) .......................................... 198 52 680
Jan. 25, 1999 (DE) .......................................... 199 02 878

(51) Int. Cl.$^7$ .............................. G02F 1/01; G02B 5/22; G02B 5/23; G02C 7/02; G02C 7/10; F21V 9/100

(52) U.S. Cl. ........................ 359/241; 359/888; 351/159; 351/163; 252/582; 252/586

(58) Field of Search ..................... 65/30.11; 204/157.15; 252/582, 586, 589; 351/159, 163; 359/241, 885, 888; 501/13; 546/277.4, 282.4

(56) References Cited

U.S. PATENT DOCUMENTS

| | | | | |
|---|---|---|---|---|
| 4,818,096 A | * | 4/1989 | Heller et al. | ................. 351/163 |
| 5,384,077 A | * | 1/1995 | Knowles | ...................... 252/586 |
| 5,466,398 A | * | 11/1995 | Van Gemert et al. | ........ 252/586 |
| 5,753,146 A | * | 5/1998 | Van Gemert et al. | ........ 252/586 |

FOREIGN PATENT DOCUMENTS

| | | | | |
|---|---|---|---|---|
| EP | 0 250 193 A2 | * | 12/1987 | ............ G02B/1/04 |
| WO | WO-95/00519 A1 | * | 1/1995 | ......... C07D/491/04 |
| WO | WO-95/00866 A1 | * | 1/1995 | ............ G02B/5/23 |
| WO | WO-95/00867 A1 | * | 1/1995 | ............ G02B/5/23 |
| WO | WO-97/37254 A1 | * | 10/1997 | ............ G02B/5/23 |

\* cited by examiner

Primary Examiner—Georgia Epps
Assistant Examiner—David N. Spector
(74) Attorney, Agent, or Firm—Crowell & Moring LLP

(57) ABSTRACT

A neutral-colored gray photochromic plastic article which remains almost completely color-neutral or gray both during darkening as well as during bleaching. The plastic article according to the invention may be employed as a neutral-color gray photochromic ophthalmic lens.

8 Claims, 2 Drawing Sheets

NEUTRAL-COLORED GRAY PHOTOCHROMIC PLASTIC OBJECT

BACKGROUND OF THE INVENTION

The invention concerns a neutral-color gray photochromic plastic article which remains almost completely color-neutral or gray both when darkening and when fading. The plastic article according to the invention may in particular be used as a neutral-color gray photochromic ophthalmic lens.

Photochromic plastic products, especially ophthalmic lenses have been on the market since the Eighties. The first lenses to find a wider distribution, e.g. the Rodenstock Perfalit Colormatic (since 1986) or the tinted Transitions lens from Transitions Optical Inc. (since 1990) and offered by a number of lens manufacturers contained spiro-oxazines as the photochromic dyes which darkened in blue hues. Upon moderate stimulation, this, combined with the brownish pre-coloration of the lens, produced an approximately gray color. Later products such as the "gray" Transitions Plus lens (since 1992), or the brown lenses Transitions Eurobraun and Hoya Sunbrown (since 1994), or the Rodenstock Glas Perfalit Colormatic neu (since 1995) already contained pyrans as well as spiro-oxazines and/or fulgides. Products currently available commercially such as the lens Transitions III preferably use pyrans, especially naphthopyrans and the larger ring systems derived from these. Of these, the Transitions III products with their refractive index of 1.56 are based on U.S. Pat. No. 5,753,1461.

Various color systems have been developed and defined by which to objectively characterize colors. The most widely known, and most suited to ophthalmic lenses, is the L*a*b* or CIELAB color system (1976), in which the brightness (L*) and the color (a*, b*) can be represented by a point within a sphere. During its darkening or fading process, a photochromic lens may be described by a continuous set of points, i.e. a curve within a three-dimensional space. The principal factor in assessing the transmission color of an ophthalmic lens is the projection of this curve onto a central plane, i.e. only the a* and b* values. The system here is equispaced, i.e. the same color distances in the system correspond to the same color differences.

In this color space, a lens which remains at the zero point with respect to a* and b* during the darkening and lightening cycle, i.e. which moves only along the L* axis, represents the ideal case for a neutral-color lens. It passes theoretically from white (=colorless since a lens, especially an ophthalmic lens, is considered in terms of transmission, not reflection) through all gray tones to black, i.e. to complete opacity. In all cases then, the lens is colorless or gray. This mathematical target value is—as are the end points—not absolutely attainable in reality, i.e. small deviations from the zero point in the a*b* plane are unavoidable.

U.S. Pat. No. 5,753,146 relates to compositions comprising at least two photochromic naphthopyran compounds which are free of amino-substituted aryl groups at the carbon atom adjacent to the oxygen atom of the pyran ring. These compositions are intended, when inserted into an appropriate carrier and exposed to ultraviolet solar radiation, to exhibit in the activated state a gray or brown neutral color contained within the a* and b* ranges from +10 to −10 of the CIELAB color system. Measurements of the lenses described as prior art in U.S. Pat. No. 5,753,146 have shown that their color locus in the darkened state is at a* =+8 and b*⁻+4. During the fade phase, the values even reach a* =+12 and b⁻+14. For the chroma C* which is defined as the root of the sum of the squares of a* and b* and characterizes the deviation from the ideal gray point, values are found in the darkened state measuring C*⁻9.0, and in the extreme case measuring up to C*⁻18.8. As a result, one can no longer speak in terms of a color-neutral lens; rather, the strong color shift during darkening and fade results in an effect which is characterized as the "chameleon effect." Thus the lenses described in U.S. Pat. No. 5,753,146 as photochromic "gray" lenses, as well as other available lenses of prior art, move a considerable distance during darkening and fade from the zero point. To be sure, based on measures described in U.S. Pat. No. 5,753,146, the color loci of lenses in question could be limited to smaller values. The C* value was halved to 9.26; however almost the entire color curve is found in the green-blue color quadrant. The remaining high chroma value as well as the blue-dominated color curve are thus still far from the ideal of a neutral-color gray lens. For the known lenses of prior art, particularly for those described in U.S. Pat. No. 5,753,146, a pronounced color curve during darkening and fade remain characteristic.

SUMMARY OF THE INVENTION

The object of the present invention is thus to produce a color-neutral gray photochromic plastic article which remains almost completely color neutral, i.e. gray, both during darkening as well as fade.

This object is achieved by the embodiments characterized in the claims. Specifically, a color-neutral or gray photochromic plastic article is produced which comprises incorporated into it at least two different photochromic color centers from the class of benzopyrans and higher anellated ring systems derived therefrom, the article being characterized in that during a 15-minute exposure of 50 klux at 23° C. according to prEN 8980 and a 15-minute fade in the dark, it passes only through color loci for which the chroma is $C^*<8$, preferably $C^*<6$, more preferably $C^*<5$.

In an especially preferred embodiment of the present invention, the color locus of the plastic article, after a 15-minute exposure of 50 klux at 23° C. according to prEN 8980, exhibits a C* value of <5, preferably $C^*<4$, more preferably $C^*<3$.

In another embodiment of the present invention, the spectral transmission of the article according to the invention is preferably under 25%, more preferably under 20% in the range of 400 to 560 nm in the darkened state after a 15-minute exposure of 50 klux at 23° C. according to prEN 8980. The spectral transmission of the article according to the invention is preferably under 50% in the range of 700 nm in the darkened state after a 15-minute exposure of 50 klux at 23° C. according to prEN 8980.

An important aspect is the most constant transmission possible in the central range of the visible spectrum. Thus the spectral transmission difference in the range of 415 to 540 nm in the darkened state after a 15-minute exposure of 50 klux at 23° C. according to prEN 8980 should, for example, be under 10%, more preferably under 8%.

In another embodiment, the spectral transmission according to $V_\lambda$ in the completely deactivated state given a 2 mm material thickness without antiglare measures is above 80%. Photochromic lenses are all-purpose lenses; ideally they should replace both a clear lens as well as a sun-protective lens. The resulting requirement is for the highest transmission possible when not stimulated by light such as e.g. at night. Combined with antiglare measures, the aforementioned value allows for transmission values approaching or at 90%.

The plastic article according to the invention may be employed as an optical element such as a lens for which the refractive value measured at the Na-d line lies between 1.49 and 1.76. In particular, the plastic article according to the invention may be employed as an ophthalmic lens.

DETAILED DESCRIPTION OF PREFERRED EMBODIMENTS

According to the present invention, for the first time a photochromic plastic article has been produced which remains almost completely color neutral, i.e. in fact consistently gray, both during darkening as well as during fade. The present invention is based on taking into account specific selection parameters with respect to photochromic dyes to be used in a photochromic plastic lens.

Figure 1:
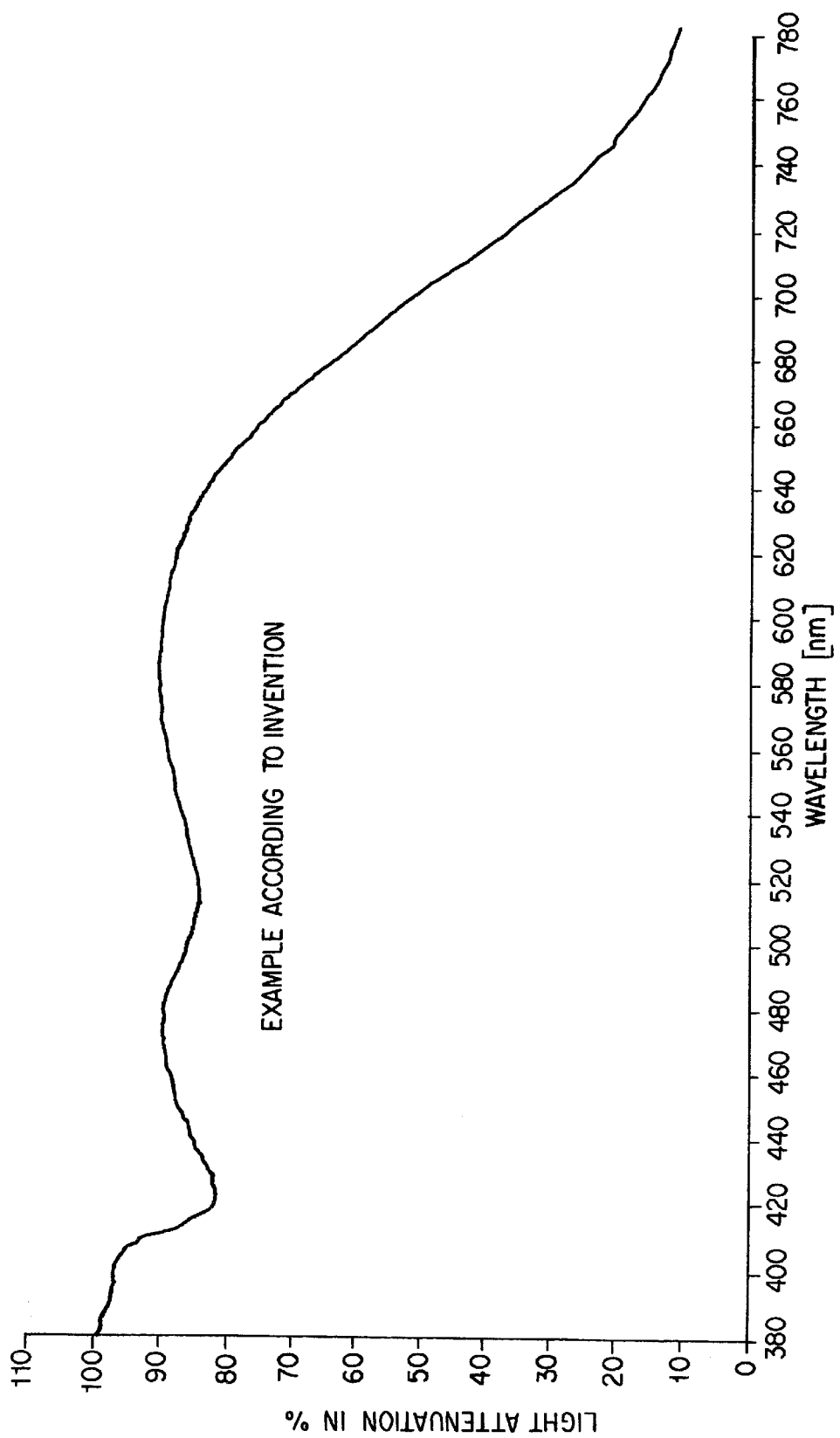
FIG. 1 shows the absorption in the visible spectral range of a typical example according to the invention after a 15-minute exposure of 50 klux at 23° C. according to the measuring procedure described in prEN 8980.

A neutral-color gray photochromic plastic article according to the invention exhibits, for example, the spectral absorption shown in FIG. 1 in the visible spectral range after a 15-minute exposure of 50 klux at 23° C. according to the measuring procedure described in prEN 8980. In the range from 420 nm to 620 nm, the spectral transmission difference is under 10%; this condition is maintained within a tolerance limit of ±10 nm even during darkening and the first 15 minutes of fade. In the event a lower absorption in the red spectral range is desired or acceptable, the neutral-color impression may, for example, be attained with a range reduced to 600 nm.

The color locus of the photochromic plastic article which contains more than one photochromic dye depends on the spectral composition of the excitation light. This is true not only in the excitation phase (direct sunlight or scattered light) but also in the fade phase for low light levels. In the framework of the present invention, the following discussion utilizes a standard which is independent of all eventualities at the site of measurement such as the season or time of day, geographic latitude, altitude, meteorological and climatic conditions, etc. The use of the solar simulator described in prEN 8980 permits an exposure approaching natural conditions given varying temperatures and exposure levels. An analysis of the transmitted light by a diode array and computer—as described in more detail in the technical section of prEN 8980—allows for the determination of transmission and color locus every 3 seconds. In the framework of the present invention, the color curve was observed over a 15-minute period of darkening at 50 klux and subsequently a 15-minute period of fade in the dark at a standard temperature of 23° C.

According to the present invention, a color-neutral gray photochromic plastic article is one for which the color locus during the described darkening and fade continues to remain close to the zero point. Preferably all four quadrants of the CIELAB color system are passed through here. This may occur in either a clockwise or counterclockwise direction, or in a loop movement (figure eight). Since the point of origin is reached again usually only by special measures (e.g. baking) and at 23° C. not within 15 minutes of fade, the color locus curve is usually not closed. The ideal case of concentric circles surrounding a zero point cannot be attained precisely; the shape of the color locus motion is usually ellipsoid, square or rhombic. The important factor for the neutral-gray color is the C* value. The color-neutral gray photochromic plastic article according to the present invention exhibits a C* value which at no time during the described cycle exceeds the value of 8. Preferably, the color-neutral gray photochromic plastic article according to the present invention exhibits a C8 value of C*<6, more preferably C*<5.

Of special significance for the eyeglass wearer is the color locus in the fully darkened state after 15 minutes exposure. Unlike the color loci during darkening and fade, this is perceived in a quasi-stationary manner, i.e. over an extended period of time. According to the present invention, the color-neutral gray photochromic plastic article exhibits a color locus after a 15-minute exposure of 50 klux at 23° C. according to prEN 8980 with a C* value of <5, preferably with C*<4, especially preferably with C*<3.

It is generally known that a neutral hue is produced from additive mixing by mixing at least two colors. Given only two colors, these should be approximately complementary, i.e. the absorptions of the photochromic dyes or their maxima must be connectable by a straight line passing through the "white field" in the UCS chromaticity diagram of CIE 1976 for 2°-standard observer. This means that given only two dyes, the absorption maximum of the one dye should lie below about 496 nm, with the second above about 570 nm. Values of approximately 100 to 130 nm thus result as the difference between absorption maxima for possible combinations.

The decisive factor for the true color locus of neutral-gray lenses is, however, not simply the position of the absorption maximum but the shape of the absorption band in the visible spectral range. Unlike oxazines, pyrans exhibit a very broad "soft" structural maximum-wavelength absorption band in the visible spectral range. Additionally, different pyrans, for example those described in WO 98/28289, possess two absorption bands in the visible spectral range, with the shorter-wavelength bands having nearly the same intensity as the long-wavelength bands. These compounds are used preferably in cases where the second dye should still exhibit a pronounced absorption even in the very long wavelength visible spectral range around 700 nm. Where such broad absorption is desired, preferably two or more photochromic compounds are used.

To prevent photochromic plastic lenses from displaying different colors under varying exposure conditions, e.g., early morning or late afternoon by contrast to the midday sun, the UV absorption is critical. UV here means not only the pure UV range up to 380 nm but also the very short wavelength visible light up to about 400 nm. Here the decisive factor is not so much the position of the UV maximum but rather the shape of the UV absorption bands. In terms of their absorption and concentration, the dyes must be selected such that no single dye takes up more than 60% of the intensity of the excitation light above 380 nm.

Where a dye exhibits several absorption bands of nearly equal intensity in the visible which safely cover the wavelength range from 420 to 580 nm, then it is possible to obtain a neutral-color lens with only one photochromic dye. This has the additional advantage that all factors which might impair a neutral color during darkening and fade, such as varying darkening and fade rates, are eliminated. In this case, the color is also not affected by the temperature (no variable temperature dependence) or the spectral composition of the excitation light (no varying excitation spectra).

In principle, photochromic plastic lenses may be produced in three different ways. First, the photochromic dyes may be dispersed homogeneously in the plastic lens material. Alternatively, they may be introduced (usually only on the convex side) into the surface of the plastic lens by diffusion using heat. Additionally, they can be applied as a layer on the plastic lens. For the first and last production methods, concentrations may be determined based on the individual data of the specific photochromic dyes, while for diffusion-dyed lenses, other characteristic data are required. Critical here are, in addition to the dye used, the specific polymer matrix used, the diffusion rate, and the penetration depth therein of the dye. Of additional importance are: the dyeing time, dyeing temperature, the type of intermediate carrier (lacquer) used, and even the conditions of polymerization of the plastic lens.

The ideal solution for preparing a neutral-color gray photochromic plastic article would be, as described above, a single photochromic dye with the appropriate absorption properties. In addition to the aforementioned advantages, all additionally cited problems and measures related to balancing the dyes would be obviated. Currently, however, there is no known single photochromic dye with a single color center which even approximates this property. Consequently, at least two photochromic color centers are always required at the present time. In the framework of the present invention, however, the fact is taken into account that the at least two color centers may be present in a single molecule in which these color centers are covalently linked, for example, by spacer groups such as alkyl chains as described in DE 44 20 378, for example.

According to the teaching of U.S. Pat. No. 5,753,146, a lens is dyed using two pyrans that exhibit similar absorption maxima in the UV range, saturation absorptions, darkening and fade rates, and their maximum wavelength absorption maxima at 425 nm or 540 nm, is an especially preferred example. As was shown earlier, such a lens is never gray or brown, however, but red to red violet. Completely ignored in U.S. Pat. No. 5,753,146 is the fact that especially pyrans with $\lambda_{max}$>525 nm are often characterized by two or more absorption maxima in the visible spectral range. These must be taken into account if their intensity is greater than approximately 50% of the main band. Additionally, not only the position but also the shape and width of the absorption band(s) are of particular significance. In U.S. Pat. No. 5,753,146, the individual dyes and mixtures are introduced into the different plastics and according to differing dyeing methods. This makes little sense since the photochromic dyes, especially the polar open form, exhibit solvatochromic effects. Consequently, $\lambda_{max}$ is dependent on the polymer matrix used. This applies as well to light sensitivity and saturation absorption, but most importantly to the fade rate.

In order therefore to produce the plastic article according to the invention, the individual dyes to be employed must be tested in the plastic into which the mixture will later be incorporated. In the case of incorporation by diffusion, the procedure is followed by which all dye parameters correlate to the process to be used later for production. First, in terms of the specific dyes to be employed, the full UV-VIS spectra in the 300 to 780 nm range of absorption (extinction) are recorded, both in the unexposed and exposed state after 15-minute exposure at 23° C. From this, the spectral ΔOD curve may be generated by subtraction (OD=optical density). The concentration of the dyes in the specimens can be adjusted such that approximately equal ΔOD values may be obtained in $\lambda_{max}$ VIS.

To produce the plastic article according to the invention, a selection must then be made according to the spectral absorption behavior in the UV range. Here, as mentioned above, not just the $\lambda_{max}$ UV but the total UV absorption is critical. First the absorption (extinction) in the unexposed state is evaluated. Because some of the photochromic dyes in question absorb well beyond the UV limit, generally set at 380 nm, UV range is understood to mean the wavelength range =410 nm in which the light sensitivity of the average human eye is still less than about 0.1% of the maximum value. The absorption function is then combined with the spectral distribution of solar radiation $E_{S\lambda}$ ($\lambda$) when the use of the photochromic plastic article under natural sunlight is to be the principal application. For this purpose, the values found in "proposed standard solar-radiation curves for engineering use," J. Franklin Inst. 230 (1940) may be consulted. For other applications, the spectral distribution of the radiation of the relevant excitation light source is used. For combined use, only those dyes are selected whose thus evaluated absorption integrals do not differ from one another by more than a factor of 2. This is repeated in similar fashion for UV absorption (extinction) in the exposed state.

To produce a plastic article according to the invention, the absorption behavior in the visible range is employed. For each dye, the absorption range can be determined in which the absorption ΔOD is at least 80% of the $\lambda_{max}$ VIS value. To produce a plastic article according to the invention, the dyes are selected so that the absorption ranges cover the spectral range from 420 to 600 nm such that the differences and/or overlaps at the limit are ?10 nm. Where two or more dyes are used, mathematical absorption envelope curves must be computer-generated for dyes whose $\lambda_{max}$ VIS difference is <50 nm. These may be treated like the absorption curves of the individual dyes.

To produce a plastic article according to the invention, saturation absorption does not have the prominent significance attributed to it in U.S. Pat. No. 5,753,146 since it may also be adjusted by modifying the concentration of the dye in the mixture. In addition, it is a function of the fade rate, i.e. photochromic dyes that fade more slowly always have higher ΔOD values at saturation than do the faster-fading dyes of related structure. Since inefficient photochromic dyes cannot be utilized economically, dyes available commercially differ in their $\Delta OD_{sat}$ only by a factor of 2 at maximum, as Table 1 of U.S. Pat. No. 5,753,146 also shows. Since according to the Lambert-Beer law, the absorption is an exponential function of concentration, this can be achieved with only small variations in concentration (at least as long as an approximately linear range is involved).

On this basis, the conditions for obtaining a neutral color impression in the completely darkened states are met, this state being—as mentioned previously—of particular significance for the eyeglass wearer since it is experienced in a quasi-stationary manner, i.e. over an extended period of time. With regard to the neutrality of the color locus during the entire darkening and fade process in terms of the production of a plastic article according to the invention, other factors must be considered such as the reaction rate of the dyes when darkening. Darkening over time is not a linear function. Under the cited measurement conditions at 23° C., currently available photochromic plastic ophthalmic lenses reach after 1 minute about 60% to 76% of the maximum darkening achieved after 15 minutes exposure (calculated in ΔOD). The 50% value is reached in as little as 17 to 40 sec.

In this regard, an evaluation of the absorption after 5 sec used to estimate the value for one minute, as suggested in U.S. Pat. No. 5,753,146, produces an incorrect impression. In this amount of time, only 15% to 25% of the final value is reached. The "vertical-take-off" varieties of dye which are overtaken in 10 sec by the rest and thus do not have a dominating effect are thereby overvalued. Even for this characteristic, absolute values have little meaning; rather, it is the reciprocal relation which is important. To produce a plastic article according to the invention, the procedure can be followed by which the time is measured during which the photochromic dye in question reaches 50% of the final value. The faster (fastest) darkening dye should thereby not fall short of the slower (slowest) darkening dye by more than about 30%.

To produce a plastic article according to the invention, the matching of fade times is of prominent importance. The fade or half-value period is that period which the oil dye in the plastic article requires at 23° C. to retain half the absorption difference between the unexposed state and the state after 15 minutes exposure. To maintain the neutral color impression over the 15-minute fade phase, the relative difference should not exceed 25%. Contrary to the teaching of U.S. Pat. No. 5,753,146, the absolute value or the absolute difference is meaningless for the neutrality of the color; rather it is the intended use of the plastic article which determines the parameters for the absolute value of the fade rate.

Since the individual skilled in the art does not have an unlimited selection of photochromic dyes available to him/her, the ideal case described in the introduction as prior art, i.e. an absolutely neutral lens for which the color locus always remains at the zero point with respect to a* and b* during the darkening and fade cycle and moves only along the L* axis, is only theoretically attainable; however, the procedure described here allows for the production of a plastic article according to the present invention which for the first time closely approaches this ideal case, i.e. the procedure actually yields a neutral-color gray plastic article or plastic lens.

It is possible to place the color locus in the completely darkened state at the zero point of the a*b* coordinate system, but for the other color loci, a deviation from this is unavoidable. However, such deviations are not detrimental or are not perceived even by the color-conscious eyeglass wearer as color deviations if the chroma C* or chroma difference ΔC* is around 1 or less. This is understandable in that the color states are seen. sequentially, not side by side.

Figure 2:
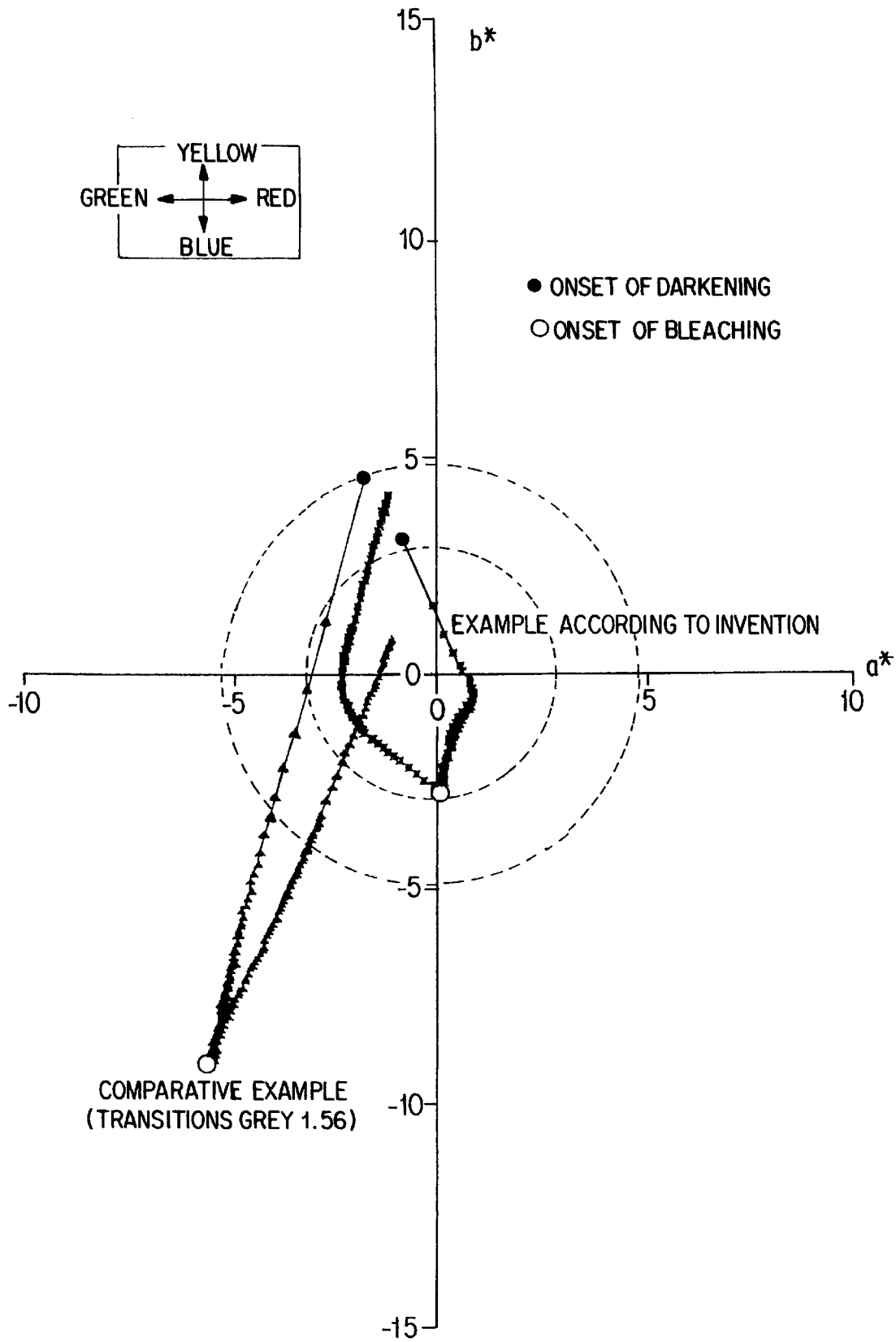
FIG. 2 show the color locus curve in the a*-b* color space of the CIELAB system for a typical example according to the invention as compared with the color locus curve of the example provided by U.S. Pat. No. 5,753,146 (corresponding to the Transition gray lens 1.56) during a 15-minute exposure of 50 klux at 23° C. according to the measuring procedure described in prEN 8980 and a 15-minute fade in the dark at 23° C.

FIG. 2 shows the color locus curve in the a*b* color space of the CIELAB system for a typical example according to the invention (mass-dyed in the plastic material TS-150 from Tokuyama) and for Example 4 of U.S. Pat. No. 5,753,146 as a representative comparison sample (surface-dyed in CR-407 by PPG) during a 15 minute exposure of 50 klux according to prEN 8980 and a 15 minute fade in the dark at 23° C.

The chroma C* of the comparison example is 10.5 in the completely darkened state, whereas the value for the example according to the invention is C*<3. Additionally, at no time during darkening and fade is a C* value of 5 exceeded.

The following discussion explains in detail the procedure for producing the neutral-color gray photochromic plastic article according to the invention.

Reference is made to PCT-DE 98/02820 in regard to creating the specimens and to the measuring equipment.

As the carrier or matrix for the photochromic dyes to be employed or used, the plastic article according to the invention contains one or more plastic materials. The plastic materials used can be those plastics normally used in prior art, especially for ophthalmic purposes. For example the plastic material may selected from among: poly($C_1$–$C_{12}$-alkyl)methacrylates, polyoxyalkylene methacrylates, polyalkoxyphenol methacrylates, cellulose acetate, cellulose triacetate, cellulose acetate propionate, cellulose acetate butyrate, polyvinyl acetate, polyvinyl alcohol, polyvinyl chloride, polyvinylidene chloride, polycarbonates, polyesters, polyurethanes, polyethylene terephthalate, polystyrene, poly-α-methylstyrene, polyvinyl butyrate, copoly(styrene methylmethacrylate), copoly(styrene acrylonitrile) and polymers of components of the group, consisting of polyol(allyl carbonate) monomers, polyfunctional acrylate, methacrylate or diethylene glycol dimethacrylate monomers, ethoxylated bisphenol-A-dimethylacrylate monomers, diisopropenyl benzene monomers, ethylene glycol bismethacrylate monomers, poly(ethylene glycol)bismethacrylate monomers, ethoxylated phenol methacrylate monomers, alkoxylated polyalcohol acrylates, and diallylidene pentaerythrite monomers or mixtures thereof.

First, all characteristic values are measured for the relevant photochromic compounds in the material which is provided for the neutral-gray plastic article according to the invention. The specimens for the characteristic values are produced in various ways depending on the process by which the photochromic dyeing is to be performed. In the case of mass dyeing, i.e. the admixture of the photochromic dyes before polymerization, the following method has proven to be effective. The dyes are added to the prepared cast resin batch (monomers, initiators, any additives such as antioxidants, UV absorbers) in a concentration of 0.0%1 to 0.1 wt. %, preferably 0.03% to 0.06 wt. %. Polymerization of these specimens is performed in the same polymerization program intended for the final plastic article. To determine the excitation maximum in the UV or short-wavelength visible spectral range, the dyes must be incorporated in the same manner in a cast-resin batch without additives. In the case of photochromic dyeing of the plastic article by coating, the concentration is based on the thickness of the coating. For example, the quantities 2 wt. % for 20 μm and 1 wt. % for 40 μm have proven to be suitable. The product of the concentration of the dye in the completely cured layer in % of the coating weight and of the coating thickness should preferably be the value $4 \times 10^{-7}$. If the process calls for the photochromic surface dyeing of the plastic article by thermodiffusion, the concentration may be determined only with great effort, e.g. through quantitative analysis or by UV absorption of the concentration series. The method has proven adequate, however, by which the dyeing conditions (temperature program) for a dye whose absorption maximum is in the visible spectral range at about 550 nm are adjusted such that the specimen exhibits an absorption difference of 0.7 before and after standard exposure—measured in ΔOD according to the $V_\lambda$ of the spectral light sensitivity of the human eye. All other samples are then produced using exactly the same dyeing parameters with the other individual photochromic dyes.

The specimens were measured, as described in the experimental section of prEN 8980, on a kinetics test bench. The measured light passing through the specimen should be capable of being analyzed in rapid sequence according to transmission and color locus, e.g. using a diode array spectrometer. The result of this measurement is the color locus of the specimen before exposure and at any given time during the exposure and the fade phase. The latter generally occurs in the dark. Depending the intended application of the plastic article, this may also occur under standard illuminant A (incandescent light) or under attenuated exposure (shadow state). At minimum, a spectral analysis is performed before exposure, at the end of exposure and at the end of the measurement period, i.e. an absorption spectrum is recorded in the range of about 350 to 800 nm. The conditions for simulating natural exposure by sunlight, such as intensity and spectral distribution of the excitation light, are established in prEN 8980; for ophthalmic lenses, a measurement temperature of 23° C. and an exposure intensity of 50 klux have proven appropriate. However, other temperatures and exposures are possible, depending on the later principal application of the plastic article. When the photochromic article is intended for use in a broader temperature range, the temperature dependency of the photochromic effect is usually of significance. In this case, the samples are measured at two temperatures which include at least 80% of the later control range. With ophthalmic lenses intended for the European markets, for example, these values are 10° C. and 35° C. Where the fatigue from aging of the photochromic reaction is of significance, the samples are measured again after artificial aging (e.g. 50 h in the Suntest device made by Heraeus).

The following data are then obtained from the spectral measurements: from the spectrum in the unexposed state, the longest wavelength excitation maximum in the UV ($UV_{max}$) and from the last spectrum at the end of exposure, generally the completely activated state, the longest wavelength absorption maximum in the visible spectral range ($VIS_{max}$). The measured difference for ($VIS_{max}$) in optical density ($\Delta OD$) between the fully activated state and the unexposed state is designated $L_{max}$. The difference from the unexposed state after 15 sec exposure is designated $L_e$. The ratio of $L_e$ to $L_{max}$ is $V_e$. During fade, the time $Z_a$ which the sample requires to fade in $VIS_{max}$ from the fully darkened state in optical density by the value $L_{max}/2$, is the critical parameter. The value $Z_a$ is given in seconds.

If the temperature dependency is also required, the absolute difference of the $L_{max}$ values for the two limiting values, divided by the mean of the two $L_{max}$ values, provides the required $T_a$. This value increases according to the temperature dependency of the specimen. The ratio of the $L_{max}$ values for the samples after and before aging is designated the aging value A.

The photochromic dyes are then listed in descending order in the first column of a table by their $VIS^{max}$ value. The corresponding $Z_a$ values are entered in the second A column, while the $V_e$ values are entered in the third column. The $UV_{max}$ values are listed in a fourth column. The temperature dependency $T_a$ may be entered in a fifth column, while the aging value A may be shown in the sixth column.

For the neutral-gray article according to the invention, the photochromic dyes used as the base dyes are those for which the $VIS_{max}$ value is above 550 nm, i.e. one or more essentially blue naphthopyran dyes, as explained below. Since the spectral light sensitivity of the human eye is highest at this wavelength and its product using the standard illuminant D 65 at 620 nm essentially corresponds to that at 500 nm, the subjective impression of the photochromic reaction, i.e. the intensity of darkening, rate of darkening and fade, etc., is characterized principally by these dyes. These and the remaining dyes are therefore divided into two groups. The selection of one (or more) photochromic dyes from this group of long-wavelength dyes forms the basis, as shown below, for the neutral-gray plastic article according to the invention. The selection is made depending on the specific requirements regarding the reaction rate for darkening and fade, temperature dependency as well as resistance to aging.

$VIS_{max}$ values around 590 nm have proven to be especially preferred. If only one photochromic dye from the group above 550 nm is selected, the $VIS_{max}$ values above 620 nm and below 570 nm have proven to be disadvantageous. In both cases, color correction is hampered; in the second case, the transmission in the red spectral range is so high that during extreme darkening, e.g. when skiing, distortions of color may occur. Where two or more dyes are selected from this group, the means of their characteristic values ($Z_a$, $V_e$, $T_a$, A) may be treated as a single dye so long as their relative values do not deviate from one another by more than 15%. Otherwise, the additional dyes to be added for each correspondingly selected base dye must be selected as explained below.

For a neutral-gray plastic article according to the invention, various criteria are—deviating from the information found in U.S. Pat. No. 5,753,146—not valid, while others are valid only to a limited extent. Most importantly, it is not the absolute, but rather the relative deviations of the dyes from each other which is of significance; $L_{max}$, the maximum darkening performance of the dyes is of no significance. For the examples selected in U.S. Pat. No. 5,753,146, $\Delta L_{max}$ is 0.01. According to the invention, those with $\Delta L_{max}>0.2$ (or rel. 30%) may also be selected. Thus all other photochromic dyes are eliminated from the selection list for which the $V_e$ and $Z_a$ values deviate by more than 30% from those of the reference dye, i.e. the base dye. A deviation by rel. up to 50%, as in the examples from U.S. Pat. No. 5,753,146, precludes the maintenance of the gray color during darkening and fade. On the other hand, the absolute value has no significance in terms of maintaining the neutral-gray color.

Where temperature dependency is important, of the remaining available photochromic dyes, all those are eliminated for which the $T_a$ value deviates by more than 30% from that of the reference dye. Where resistance to aging is important, of those remaining, all are eliminated for which the A value deviates by more than 20% from that of the reference dye. For the use of the photochromic article according to the invention under highly varying exposure conditions, especially those with highly varying spectral intensities in the UV and short-wavelength range, as for example for ophthalmic lenses, the $UV_{max}$ value is also of decisive importance. The relative intensity of short-wavelength radiation at 360 nm vis-à-vis 390 nm ($I_{360}/I_{390}$) is, for example, much lower in big-city smog than in high mountainous areas. If the neutral-gray color according to the invention is to be maintained not only under the standard illuminant but also under these contrasting conditions, the $UV_{max}$ values must not deviate by more than 15 nm from that of the reference dye.

Starting from the 100, for example, photochromic dyes from the group of benzopyrans and of higher anellated ring systems derived therefrom, such as the naphthopyran dyes which are readily available to the individual skilled in the art, and based on the above criteria—as a function of the selected reference dye or base dye—the number of photochromic dyes to be added for the production of the neutral-gray plastic article according to the invention is generally reduced to less than a dozen. In order to further reduce the additional photochromic dyes required to obtain a photochromic plastic article according to the invention, the absorption spectrum of the reference dye in the fully activated state is taken into account. Viewed physically, an ideal gray lens has an absorption which is constant over the entire visible spectral range from 380 nm to over 780 nm. However, based on the spectral light sensitivity of the human eye, this is not necessary from a physiological point of view. The ranges below 430 nm and chiefly above 680 nm are of secondary significance. First, those wavelengths are determined in which a relative absorption minimum is present. Then those dyes with the corresponding $VIS_{max}$, values are selected from the aforementioned table which are suitable for closing this absorption gap. If, based on the prior limitations, the selection is too small from which to find a precisely matching dye, an appropriate dye mixture is used to fill this absorption gap. The total concentration to be used lies in the range of 25% to 40 wt. % of the reference dye. For most applications, e.g. for use as sun-protective lenses in eyeglasses, the concentration of the reference dye required for sufficient darkening lies outside the scope of the Lambert-Beer law.

The compounds usable for the present invention all belong to the class of benzopyrans and higher anellated ring systems derived therefrom such as the naphthopyrans and fluorenopyrans. For the upper wavelength range, these are chiefly: the 2,2 position aromatically or heteroaromatically substituted [2H]-naphtho(1,2-b)-pyrans, while for the lower wavelength range: the [3H]-naphtho(2,1-b) pyrans correspondingly substituted in the 3,3 position. Examples of long-wavelength absorbing dyes which may function as reference or base dyes ($\lambda_{max}$=550 nm) include the naphthopyrans described in PCT-DE 98/02820 and [2,1-f]naphtho [1,2-b]pyran derivatives and/or spiro-9-fluoreno [1,2-b] pyran derivatives described in PCT/EP 99/05258. A list of preferred examples hereof includes:

3,13-diphenyl-3-(4-diphenylaminophenyl)'-13-hydroxy-6-methoxy-indeno[2,1-f]-naphtho[1,2-b]pyran, 13-(2,5-dimethylphenyl)-3-(4-diphenylaminophenyl)-13-hydroxy-6-methoxy-3-phenyl-indeno[2,1-f]-naphtho[1,2-b]pyran, 13-(2,5-dimethylphenyl)-3-(4-diphenylaminophenyl)-13-hydroxy-3-phenyl-indeno[2,1-f]-naphtho[1,2-b]pyran, spiro-9-fluoreno-13'-[3-(4-dimethylaminophenyl)-6-methoxy-3-phenyl-indeno[2,1f]naphtho[1,2-b]pyran], spiro-9-fluoreno-13'-[3-(4-dimethylaminophenyl)-3-phenyl-indeno[2,1-f]naphtho-[1,2-b]pyran], spiro-9-fluoreno-13'-[3-(4-dimethylaminophenyl)-6-methoxy-3-phenyl-indeno[2,1-f]naphtho[1,2-]pyran], spiro-9-fluoreno-13'-[3-(4-diphenylaminophenyl)-3-phenyl-indeno[2,1-f]naphtho[1,2b]pyran], spiro-9-fluoreno-13'-{3-[4-(N-morpholinyl)phenyl]-6-methoxy-3-phenyl-indeno[2,1f]naphtho[1,2-]pyran}, spiro-9-fluoreno-13'-{3-[4-(N-morpholinyl)phenyl]-3-phenyl-indeno[2,1-f]naphtho-[1,2b]pyran}, spiro-9-fluoreno-13'-{6-methoxy-3-phenyl-3-[4-(N-piperidinyl)phenyl]-indeno[2,1-f]naptho[1,2-b]pyran} and spiro-9-fluoreno-13'-{3-phenyl-3-[4-(N-piperidinyl)phenyl]-indeno[2,1-f]naphtho-[1,2-f]naphtho-[1,2-b]pyran}.

Examples of shorter-wavelength absorbing photochromic dyes which may be combined with the base dye include:

3-(4-diphenylaminophenyl)-3-(2-fluorophenyl)-3H-naphtho[2,1-b]pyran, 3-(4-dimethylaminophenyl)-3-(2-fluorophenyl)-3H-naphtho[2,1-b]pyran, 3-(2-fluorophenyl)-3-[4-(N-morpholinyl)phenyl]-3H-naphtho[2,1-b]pyran, 3-(2-fluorophenyl)-3-[4-(N-piperidinyl)phenyl]-3H-naphtho[2,1-b]pyran, 3-(4-dimethylaminophenyl)-6-(N-morpholinyl)-3-phenyl-3H-naphtho[2,1-b]pyran, 6-(N-morpholinyl)-3-[4-(N-morpholinyl)phenyl]-3-phenyl-3H-naphtho[2,1-b]pyran, 6-(N-morpholinyl)-3-phenyl-3-[4-(N-piperidinyl)phenyl]-3H-naphtho[2,1-b]pyran, 6-(N-morpholinyl)-3-phenyl-3-[4-(N-pyrrolidinyl)phenyl]-3H-naphtho[2,1-b]pyran, 3-phenyl-3-(2-fluorophenyl)-3H-naphtho[2',1-b]pyran, 6-(N-morpholinyl)-3,3-diphenyl-3H-naphtho[2,1-b]pyran and 6-(N-morpholinyl)-3-(4-methoxyphenyl)-3-phenyl-3H-naphtho[2,1-b]pyran.

However, the pyrans described in U.S. Pat. No. 5,753, 146 and EP-A-0 562 915 may also be used. In the same way, the average individual skilled in the art is also familiar with the method of adding or admixing small quantities of photochromic dyes of other classes, for example, oxazines or fulgides, as e.g. described in U.S. Pat. No. 5,753,146, without departing from the gist of the present invention. Other usable oxazines ($\lambda_{max}$=600nm) are marketed by the HCH James Robinson Company. For purposes not entailing a long-term continuous load or for which this is plays only a secondary role, small quantities of fulgides may be admixed, such as those offered by the Tokuyama Company although their $\lambda_{max}$ value should exceed 570nm.

Whereas the information or measures described in the prior art relating to the preparation of a gray plastic lens are deficient or even misleading, the above-described method results in an article according to the invention, an actually neutral-color gray photochromic plastic article which remains almost completely color-neutral or gray even during fade. Any minor corrections are well within the technical competence of the average individual skilled in the art.

What is claimed is:

1. A neutral-color photochromic plastic article comprising a plastic host material and at least two different photochromic color centers selected from the group consisting of benzopyrans and higher anellated ring systems derived from benzopyrans, wherein said article passes only through those color loci whose chroma is C*<8 during a 15 minute exposure of 50 klux at 23° C. according to prEN 8980 and a 15 minute fade period in the dark.

2. A plastic article according to claim 1, wherein the chroma of the color loci is C*<5.

3. A plastic article according to claim 1, wherein said article has a color locus which exhibits a C* value <5 after a 15-minute exposure of 50 klux at 23 ° C. according to prEN 8980.

4. A plastic article according to claim 3, wherein the color locus exhibits a C* value <3.

5. A plastic article according to claim 1, wherein said article has a spectral transmission of less than 25 % in the 400 to 650 nm wavelength range in the darkened state after a 15 minute exposure of 50 klux at 23 ° C. according to prEN 8980.

6. A plastic article according to claim 1, wherein said article has a spectral transmission of less than 50 % at a wavelength of 700 nm in the darkened state after a 15 minute exposure of 50 klux at 23 ° C. according to prEN 8980.

7. A plastic article according to claim 1, wherein said article has a spectral transmission of more than 80 % according to $V_\lambda$ in the deactivated state for a 2 mm material thickness without anti-reflection measures.

8. A plastic article according to claim 1, wherein said article is an ophthalmic lens.

* * * * *